United States Patent
Milani et al.

[15] 3,706,313
[45] Dec. 19, 1972

[54] TRAPEZOIDAL WAVESHAPE DEFIBRILLATOR

[72] Inventors: Dean L. Milani, Highland Park; Richard G. Kerwin, Prospect Heights, both of Ill.

[73] Assignee: Medical Research Laboratories, Park Ridge, Ill.

[22] Filed: Feb. 4, 1971

[21] Appl. No.: 112,587

[52] U.S. Cl. .................................. 128/419 D, 320/1
[51] Int. Cl. .............................................. A61m 1/36
[58] Field of Search .............. 128/419 D, 421; 320/1

[56] References Cited

UNITED STATES PATENTS

| | | |
|---|---|---|
| 3,093,136 | 6/1963 | Lohr .......................... 128/419 D |
| 3,258,013 | 6/1966 | Druz .......................... 128/419 D |
| 3,527,299 | 9/1970 | Kempen ...................... 128/419 D |

FOREIGN PATENTS OR APPLICATIONS 969,659  12/1950  France ........................... 128/419 D Primary Examiner—William E. Kamm
Attorney—Olson, Trexler, Wolters & Bushnell

[57] ABSTRACT

A trapezoidal waveshape, which is known to be the best waveshape for defibrillating the heart, is produced by charging a capacitor, and by starting to discharge it through a silicon controlled rectifier to the load, namely, the body of the patient. Subsequently, a second SCR is used to short circuit the first SCR and load circuit to effect termination of the trapezoidal waveshape rapidly, i.e., effectively dumping the remainder of the charge.

10 Claims, 3 Drawing Figures

PATENTED DEC 19 1972

3,706,313

Inventors
DEAN L. MILANI
RICHARD G. KERWIN

By Olson, Trexler, Wolters & Bushnell
Attorneys 3,706,313

TRAPEZOIDAL WAVESHAPE DEFIBRILLATOR

It is well recognized that defibrillation of the heart can be effected by an electrical pulse, and we believe that a trapezoidal waveshape is the most effective shape of pulse for this purpose. Therefore, it has been proposed to produce such a waveshape by charging a capacitor, and starting to discharge it through a turn-on turn-off silicon controlled rectifier (hereinafter referred to as an SCR) to the load. After a part of the charge on the capacitor has been discharged through the SCR into the load, the SCR is turned off. Although substantially a trapezoidal waveshape may be produced in this manner, it is unreliable, since the turn-off mechanisms of SCR's are less reliable than the turn-on mechanism.

It is well recognized that SCR's are easy to turn-on, but difficult to turn-off other than by eliminating the anode potential. In accordance with the present invention, an SCR is turned on to start a capacitor discharging through the SCR into the load, comprising the body of the patient having the fibrillating heart. Rather than trying to turn this SCR off, we provide a second SCR which, in proper time, turns on to short circuit the first SCR and the load, thereby effectively dumping the remainder of the charge on the capacitor, elsewhere (other than the patient load).

Thus, it is an object of the present invention to provide an improved circuit for producing a trapezoidal waveform for defibrillation of the heart. More particularly, it is an object of the present invention to use only the turn-on characteristics of an SCR to effect such a waveshape.

Other and further objects and advantages of the present invention will be understood with reference to the following specification and accompanying drawings.

Figure 1:
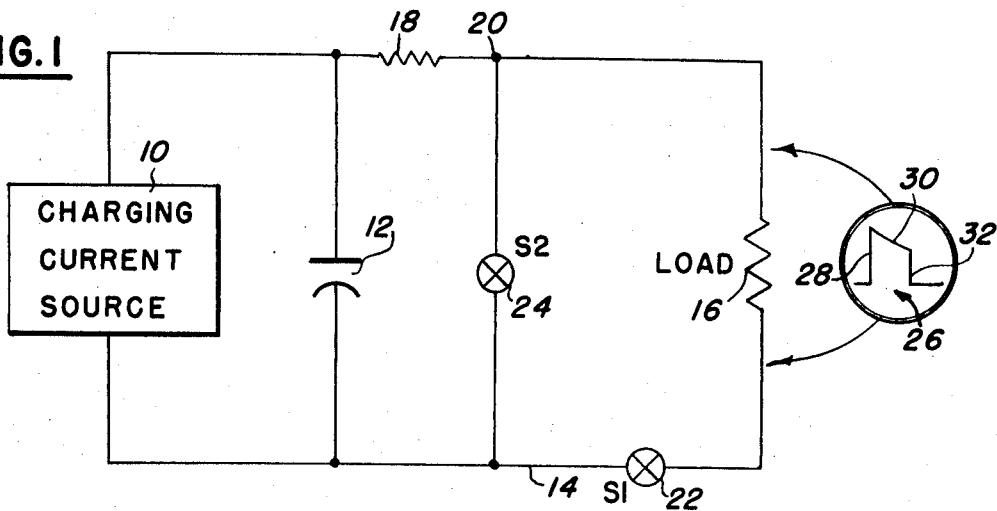
FIG. 1 is a schematic wiring diagram illustrating the principals of the present invention.

Referring first to FIG. 1, a charging current source 10 of any suitable nature is provided to charge a capacitor 12. The capacitor 12 is capable of storing an appropriate amount of energy. The lower end of the capacitor in FIG. 1 is connected to a line 14 leading through a switch 22 to the lower end of a load 16. The upper end of the capacitor 12 is connected through a resistor indicated at R and identified by numeral 18. The resistor also is connected to a junction 20, and the junction is connected to the upper terminal of the load 16. In addition, the junction 20 is connected to the line 14 through a switch S2 identified by numeral 24. Switches S1 and S2 are both normally open switches. In accordance with the present invention, but not yet necessary for an understanding of FIG. 1, the load 16, indicated as being a resistor, is a mostly resistive, impedance load, comprising the resistance of the human body to which a pair of electrodes of known construction are connected, preferably to the chest in the heart area.

The operation of the circuit of FIG. 1, is such that the capacitor 12 charges from the charging current source 10. The switch S1 is turned on, and the capacitor 12 starts to discharge through the resistor 18, switch S1, and load resistor 16. After a suitable time period, the switch S2 is turned on providing a dead short between junction 20 and line 14, whereby the remainder of the charge of the capacitor 12 is dumped through the resistor R and switch S2. The resistor R is of less resistance than the load resistor 16. As a result, the pulse indicated at 26 is produced, having a very rapid rise at 28 as the full voltage of the capacitor 12 (minus the minor drop of the resistor R) is applied to the load. The pulse then decays at 30 along a normal capacitor discharge curve until the switch S2 short circuits the load, thus immediately dropping the potential at 32 back to the base line.

As a result, a trapezoidal waveform pulse is produced with very high reliability.

Figure 2:
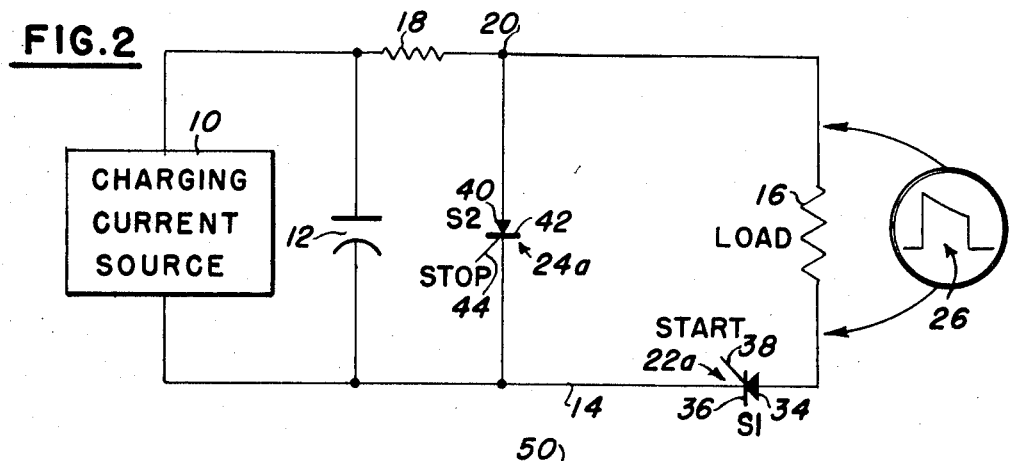
FIG. 2 is a similar schematic wiring diagram in somewhat greater detail.

Further principles of the invention are illustrated in FIG. 2, to which attention should now be directed. Most of the parts of FIG. 2 are identical with those in FIG. 1, and are identified by similar numerals, thereby avoiding the necessity of discussion thereof. The differences reside in the switch S1 and the switch S2, which are indicated respectively as 22a and 24a, since the function is the same, although the specific disclosure is different. Thus, the switch S1 is an SCR having an anode 34 connected to the lower end of the load 16, and a cathode 36 connected to line 14. A control element or trigger 38 also is provided. The switch S2 is similar, comprising an SCR having an anode 40 connected to the junction 20 and a cathode 42 connected to the line 14. There is also provided a control element or trigger 44.

When the capacitor 12 is charged, as in FIG. 1, the SCR 22a is turned on by placing a positive potential on the trigger or control element 38, with respect to the cathode 36, which thereby constitutes a start control for the circuit. When the appropriate time has come to dump the remainder of the capacitor charge by short circuiting the load, a positive potential is applied to the control element or trigger 44, which thereby constitutes a stop control for the trapezoidal waveform or pulse.

Figure 3:
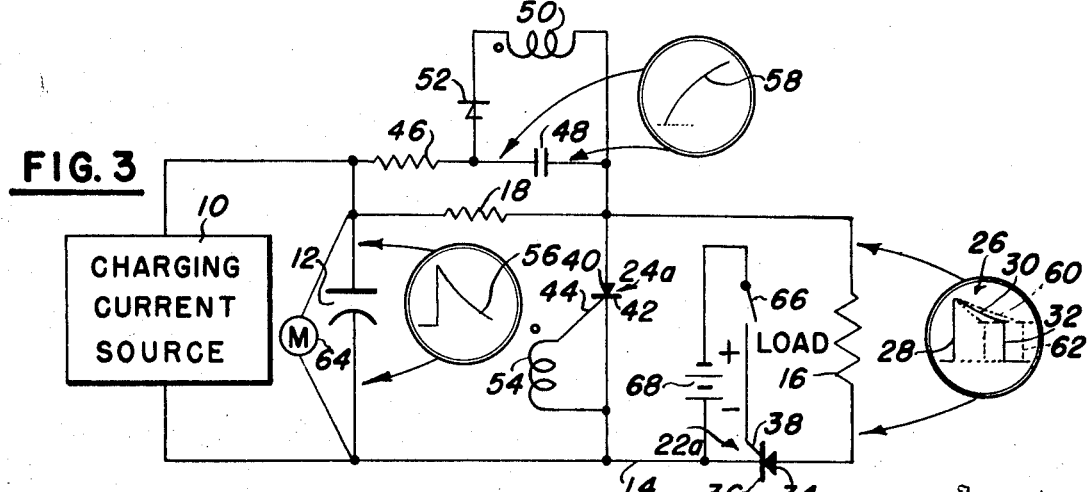
FIG. 3 is a schematic wiring diagram similar to FIGS. 1 and 2, but having complete circuit details therein.

As will be understood, it is preferred to effect the turning on of the SCR S2 by automatic means, and this is shown in FIG. 3. In FIG. 3, many of the parts are again the same, and identified by the same numerals as in FIG. 2.

The distinguishing feature of FIG. 3, as compared with FIG. 2, is that a resistor r identified by numeral 46 is connected to the top of the capacitor 12, and has in series therewith a capacitor c identified by numeral 48, the resistor 46 and capacitor 48 being in series with one another and in parallel with the resistor 18. In parallel with the capacitor 48 there is further the series combination of the primary winding 50 of a transformer T and a four-layer diode 52, the anode of the four-layer diode being connected to the junction between the resistor 46 and the capacitor 48, and the cathode being connected to one end of the transformer winding 50. The transformer winding is polarized as indicated by the dot to the left thereof.

The secondary winding 54 of the transformer, the polarity being indicated by the dot immediately above the winding 54, has one end connected to the control element or trigger 44, the other end being connected to the cathode lead of the SCR 24a.

The discharge curve of the capacitor 12 is shown at 56. Conversely, the charging curve of the capacitor 48 is shown at 58. As will be apparent, there is a generally inverse relationship, the potential across the capacitor 48 increasing as the potential across the capacitor 56 decreases. When the potential of the curve 58 across the capacitor 48 reaches the breakdown potential of the four-layer diode 52, the diode conducts, and there is an increasing current across the transformer primary winding 50. This causes a corresponding potential to be induced in the secondary winding 54, thereby to apply the desired positive potential to the trigger or control element 44 of the SCR 24a, causing the latter to fire.

Since the potential of the charging curve 58 depends directly on the potential of the discharge curve 56, the firing of the SCR 24a is controlled by the potential of discharge curve 56. The potential of the discharge curve 56 depends, in turn, on the RC time constant of the capacitor 12 in series with the resistor 18 and the load 16. As will be apparent, the resistance of the load 16 will vary depending on many nonconstant factors, such as the contact of the electrodes with the skin of the party being subjected to defibrillation, and the internal resistance of the body of this party. As a result, the pulse width of the pulse 26 will vary. If the horizontal distance between the start 28 of the pulse 26 and the end thereof at 32 is taken as the norm, a condition of lower resistance of the load 16 will cause the pulse to end at an earlier time, such as indicated by the broken line 60. On the other hand, if the resistance of the load 16 is greater, the pulse may carry on for a longer period, such as to the broken line 62. It is elementary that the current varies inversely with the load. Accordingly, regardless of the resistance of the load, the amount of energy delivered to the load remains nearly constant. Stated another way, the integrated voltage across the resistor 18 is "measured" by the circuit above it since the voltage across the capacitor 48 bears a known relation to the voltage across the resistor 18, which bears a direct relation to the potential across the capacitor 12 and the potential across the load 16. The time elapsing from the inception of firing of the SCR 22a to the inception of firing of the SCR 24a will vary nearly directly with the load 16. Since this time varies nearly directly and the current through the load varies inversely with the resistance of the load, the total amount of energy delivered to the load remains substantially constant regardless of the resistance of the load.

It will now be apparent that we have disclosed a circuit for producing a trapezoidal pulse or wave form which depends on the turn-on characteristics of SCR's, which characteristics are highly reliable, as opposed to previous systems in which both the turn-on and turn-off characteristics were relied on, the former being highly reliable and the latter being highly unreliable. The turning-on of the first SCR 22a is effected manually. An indicator 64 is connected across the capacitor 12 so that the doctor or technician can determine when the capacitor 12 has charged to the desired potential. In addition, a manually operable switch 66 is connected to the control element or trigger 38 of the SCR 22a, and the opposite pole or contact of the switch 66 is connected to the positive end of a battery or other suitable voltage source 68, the opposite side of which is connected to the line 14. Thus, when it is apparent that defibrillation of the heart of a patient is required, and the doctor or technician can read that indicator 64 indicates the capacitor 12 is charged to the requisite potential, the switch 66 is manually closed to start firing of the SCR 22a. The firing of the second SCR 22a is started in a manner heretofore described. It will be apparent that firing of the SCR 24a removes anode potential from the SCR 22a whereby the SCR 22a stops firing until the next cycle when it is again started by the switch 66. It will be apparent that each SCR functions as a controlled electronic gate.

The specific examples of the invention as herein shown and described are for illustrative purposes only. Various changes will no doubt occur to those skilled in the art, and will be understood as forming a part of the present invention insofar as they fall within the spirit and scope of the appended claims.

The invention is claimed as follows:

1. Electric circuit means for discharging a substantially trapezoidal waveshape, comprising output means adapted to be connected to a resistive load such as a human body having a heart to be defibrillated, electrical energy storage means and a discharge circuit in series with said energy storage means and said output means, said discharge circuit comprising a resistor and a first controlled electronic gate substantially in parallel with said energy storage means and said output means, a shunting second controlled electronic gate, means for turning on said first controlled electronic gate to start discharge of electrical energy to said output means, and means for thereafter starting conduction of said second gate to short circuit said first gate and output means.

2. Circuit means as set forth in claim 1, wherein each of said gates comprises a unidirectionally conductive gate.

3. Circuit means as set forth in claim 2, wherein each of said gates comprises a controlled rectifier.

4. Circuit means as set forth in claim 1, wherein said electrical energy storage means comprises a capacitor.

5. Circuit means as set forth in claim 1, wherein the means for starting conduction of said second gate includes means connected across said resistor sensitive to the voltage thereacross and further connected to said second gate to effect conduction thereof in accordance with the voltage developed across said resistor.

6. Circuit means as set forth in claim 5, wherein the means connected across said resistor comprises a series combination of a second resistor and a capacitor, said circuit means further including a transformer having the primary connected across said capacitor and the secondary connected to said second electronic gate to start firing thereof.

7. Circuit means as set forth in claim 6, wherein each of said gates comprises a unidirectionally conductive gate.

8. Circuit means as set forth in claim 7, wherein each of said gates comprises a controlled rectifier.

9. Circuit means as set forth in claim 8, wherein the electrical energy storage means comprises a capacitor.

10. Electric circuit means for discharging a substantially trapezoidal waveshape, comprising output means adapted to be connected to a resistive load such as a human body having a heart to be defibrillated, electrical energy storage means and a discharge circuit in series with said energy storage means and said output means, said discharge circuit comprising a resistor and a first electric switch means substantially in parallel with said energy storage means and said output means, a shunting second electric switch means, means for first rendering said first switch means conductive to start discharge of electrical energy to said output means, and means for thereafter starting conduction of said second electric switch means to short circuit said first gate and output means.

* * * * *